United States Patent
Bahng

(10) Patent No.: US 7,623,420 B2
(45) Date of Patent: *Nov. 24, 2009

(54) FOCUS SERVO CONTROL METHOD IN OPTICAL DISC DEVICE

(75) Inventor: Keuk Young Bahng, Osan-si (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 582 days.

This patent is subject to a terminal disclaimer.

(21) Appl. No.: 11/386,104

(22) Filed: Mar. 22, 2006

(65) Prior Publication Data

US 2006/0227680 A1    Oct. 12, 2006

(30) Foreign Application Priority Data

Mar. 23, 2005    (KR)    .................. 10-2005-0024135

(51) Int. Cl.
G11B 5/09 (2006.01)
B41J 2/01 (2006.01)

(52) U.S. Cl. .................... 369/47.1; 347/101

(58) Field of Classification Search ............. 347/101; 369/47.1

See application file for complete search history.

(56) References Cited

U.S. PATENT DOCUMENTS

| | | | |
|---|---|---|---|
| 4,497,049 A | | 1/1985 | d'Alayer de Costemore d'Arc |
| 5,959,280 A | * | 9/1999 | Kamatani .................. 369/52.1 |
| 6,202,550 B1 | * | 3/2001 | Lee et al. .................. 101/38.1 |
| 2001/0035886 A1 | * | 11/2001 | Bradshaw et al. ............. 347/2 |
| 2002/0112534 A1 | * | 8/2002 | Leigh et al. .................. 73/105 |
| 2002/0171969 A1 | * | 11/2002 | Leigh et al. ............. 360/77.03 |
| 2003/0179674 A1 | | 9/2003 | Anderson et al. |
| 2003/0179679 A1 | | 9/2003 | Morishima |

2004/0136291 A1 *  7/2004  Hayashi ...................... 369/53.2

(Continued)

FOREIGN PATENT DOCUMENTS

EP    0 532 997 A1    3/1993

(Continued)

OTHER PUBLICATIONS

Chinese Office Action dated Jun. 8, 2007.

(Continued)

*Primary Examiner*—Stephen D Meier
*Assistant Examiner*—Sarah Al-Hashimi
(74) *Attorney, Agent, or Firm*—KED & Associates, LLP

(57) ABSTRACT

A focus servo control method for an optical disc device is provided which compensates for variations present on the disc while printing a label on a label surface of the disc. The label surface of the disc is radially divided into a plurality of areas arranged about the center of the disc, and a focus swing operation is performed for each of the radially divided areas to detect an RF signal. Respective center points of pulses in the detected RF signal are regarded as optimal focus points, and focus driving voltages corresponding respectively to the center points are detected and stored in association with the corresponding areas. When a label is printed on the label surface, feed-forward focus servo control is performed based on the stored focus driving voltages. Accordingly, feed-forward focus servo control can be performed while compensating for variations the disc, thereby improving the label printing operation and quality of the resulting label.

20 Claims, 9 Drawing Sheets

U.S. PATENT DOCUMENTS

| | | |
|---|---|---|
| 2005/0057639 A1 | 3/2005 | Van Brocklin et al. |
| 2005/0058043 A1 | 3/2005 | Koegler, III et al. |
| 2005/0058044 A1 | 3/2005 | Koegler, III et al. |
| 2006/0215523 A1* | 9/2006 | Park .................. 369/53.45 |
| 2006/0244811 A1* | 11/2006 | No ........................ 347/250 |
| 2006/0256677 A1* | 11/2006 | Bahng ................... 369/47.1 |

FOREIGN PATENT DOCUMENTS

| | | |
|---|---|---|
| EP | 1 553 591 A2 | 7/2005 |
| WO | WO 03/012995 A2 | 2/2003 |

OTHER PUBLICATIONS

European Search Report dated Dec. 11, 2006.

European Search Report dated Mar. 6, 2007.

\* cited by examiner

LightScribe Disc (20)

FIG. 9

Focus Control Information Table

| Area No. | Focus Control Value |
|---|---|
| Area 0 | 3.5 Volt |
| Area 1 | 3.3 Volt |
| Area 2 | 3.0 Volt |
| Area 3 | 2.9 Volt |
| Area 4 | 2.7 Volt |
| Area 5 | 2.8 Volt |
| Area 6 | 3.0 Volt |
| Area 7 | 3.1 Volt |
| Area 8 | 3.2 Volt |
| Area 9 | 3.4 Volt |
| Area 10 | 3.6 Volt |
| Area 11 | 3.5 Volt |
| Area 12 | 3.3 Volt |
| Area 13 | 3.1 Volt |
| Area 14 | 2.8 Volt |
| Area 15 | 2.7 Volt |
| Area 16 | 2.9 Volt |
| Area 17 | 3.0 Volt |
| Area 18 | 3.2 Volt |
| Area 19 | 3.4 Volt |

FOCUS SERVO CONTROL METHOD IN OPTICAL DISC DEVICE

BACKGROUND OF THE INVENTION

1. Field of the Invention

The invention relates to a focus servo control method in an optical disc device, and, more particularly, to a method for performing focus servo control while compensating for variations present on an optical disc.

2. Background of the Related Art

Optical discs have been developed recently which allow data to be recorded on a data surface of the disc, and a label with a desired design to be printed on the opposite, or non-data, surface of the disk. The surface of the disc on which a label is printed is referred to as the label surface of the disc. Labels are typically transferred onto the label surface of the disc using a laser etching technology commonly referred to as LightScribe, in which a laser burns or etches an image onto a specially prepared, non-data side of an optical disc.

A recording layer and a reflective layer are formed on the data surface of a recordable optical disc. When an optical pickup of an optical disc device radiates a laser beam onto the data surface, the laser beam is reflected by the reflective layer and is then incident on a photo-detector (PD) of the optical pickup. Focus and tracking error signals can be produced using signals output from divided cells of the photo-detector.

When reproducing data from or recording data to a disc, the optical disc device performs a focus servo operation which moves an objective lens of the optical pickup up and down, and a tracking servo operation which moves the objective lens in a radial direction so as to minimize the levels of focus and tracking error signals generated based on the signal reflected from the data surface of the disc. Servo control on the data surface of the disc based on the feedback error signals is referred to as feedback servo control.

However, the label surface of the disc preferably has no reflective layer, and is preferably rough compared to the data surface. Thus, the focus error signal required to perform feedback focus servo control cannot be generated, and feedback focus servo control cannot be performed for the label surface of this type of disc. Thus, there is no choice but to perform feed-forward focus servo control.

However, feed-forward focus servo control cannot compensate for any surface vibration components or unevenness in the optical disc, particularly on the label surface of the optical disc. This inability to compensate causes a fatal error in the label printing operation, and a failure to properly print a label with a desired image or design on the disc The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention to provide a method for properly performing a focus servo operation for a label surface of a LightScribe disc.

It is another object of the present invention to provide a focus servo control method in which optimal focus points are detected for compensating surface vibrations of a LightScribe disc when printing a label on a label surface of the LightScribe disc, and focus servo control is performed while compensating for the surface vibrations based on the detected optimal focus points.

In accordance with one aspect of the present invention as embodiment described herein, a focus servo control method for an optical disc device includes performing focus servo control based on focus control information detected and stored for each of a plurality of radially divided areas on one surface of the optical disc, the plurality of radially divided areas being arranged along a circumferential direction of the optical disc, when recording data on the surface of the optical disc.

In certain embodiments, wherein the surface of the optical disc is a label surface of the optical disc on which a label can be printed, and wherein the focus servo control is performed in a feed-forward fashion.

In certain embodiments, the optical disc is divided radially into 20 areas, the focus control information of each of the plurality of radially divided areas includes a driving voltage or an offset voltage of a focus actuator, and is detected at an innermost part of the optical disc, and the focus control information is stored while being classified according to the areas.

Preferably, performing the focus servo control includes the steps of confirming a current area in the circumferential direction, and driving the focus actuator based on the focus control information of the confirmed current area.

Preferably, the focus servo control method also includes suspending data recording when moving outwardly by a predetermined distance while performing the data recording on the surface of the optical disc, detecting and storing focus control information of each of the plurality of radially divided areas at a position where the data recording is suspended, and performing the focus servo control based on the stored focus control information of each of the plurality of radially divided areas while continuing the data recording.

Preferably, detecting and storing focus control information includes detecting an RF signal by swinging a focus actuator in each of the plurality of radially divided areas, and obtaining focus control information corresponding to a center point of the detected RF signal, including removing a high frequency component from the detected RF signal and slicing the detected RF signal into specific reference-level pulses, obtaining respective center points of the sliced pulses, and calculating voltages for driving the focus actuator, the voltages corresponding respectively to the central points.

In accordance with another aspect of the present invention as embodied and broadly described herein, a focus servo control method for an optical disc device includes swinging a focus actuator and detecting an RF signal in each of a plurality of radially divided areas on one surface of the optical disc, the plurality of radially divided areas being arranged along a circumferential direction of the optical disc, and obtaining focus control information corresponding to a center point of the detected RF signal.

In certain embodiments, obtaining focus control information includes removing a high frequency component from the detected RF signal and slicing the detected RF signal into specific reference-level pulses; obtaining respective center points of the sliced pulses; and calculating voltages for driving the focus actuator, the voltages corresponding respectively to the central points, and storing the obtained focus control information of the plurality of radially divided areas while classifying the obtained focus control information according to the areas, wherein the focus control information includes a driving voltage or an offset voltage of the focus actuator.

In accordance with another aspect of the invention, a method of printing on a LightScribe disc may include determining whether a recordable medium is a LightScribe disc based on a first pattern corresponding to spokes provided near an inner circumference of the recordable medium using a spoke detector, determining whether a surface facing an optical pickup device corresponds to a data surface or a label surface based on whether reflection of optical light occurs on the surface or within the LightScribe disc, detecting a second pattern corresponding to an index mark, synchronizing with a spoke corresponding to position "0", the spokes providing location information of an index mark, a saw teeth area, a media ID area, and controlling a speed of rotation of the LightScribe disc, detecting media ID on the Lightscribe disc, and printing on the label surface of the LightScribe disc, wherein the label surface is divided radially into a plurality of areas, and a first focus point for the optical pickup device is determined for each of the plurality of areas, and the first focus point is used in its corresponding area of the label surface during printing.

In accordance with another aspect of the invention, a method of printing a label on recordable medium including a data surface configured to receive and store data on a first side thereof, and a label surface configured to receive a label printed thereon on a second side opposite the first side, may include reading a first pattern from the recordable medium to determine if the recordable medium includes both a data surface on a first side thereof and a label surface on a second side opposite the first side thereof, wherein the first pattern is read by a spoke detector and comprises a plurality of spokes provided proximate an inner circumference of a recordable medium, determining if a surface of the recordable medium facing an optical pickup device corresponds to the data surface or the label surface of the recordable medium based on a reflection of optical light from the surface of the recordable medium facing the optical pickup, synchronizing operation of the optical pickup device with a reference position delineated by the first pattern if it is determined that the surface of the recordable medium facing the optical pickup device is the label surface, dividing the label surface into a plurality of radial areas, determining a plurality of first optimum focus points each corresponding to a respective area of the plurality of areas, and performing a label printing operation to print an image on the label surface of the recordable medium based on the plurality of first optimum focus points.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 9 is a table of focus control information managed in accordance with an embodiment of the invention.

BEST MODE OR DETAILED DESCRIPTION

Figure 1:
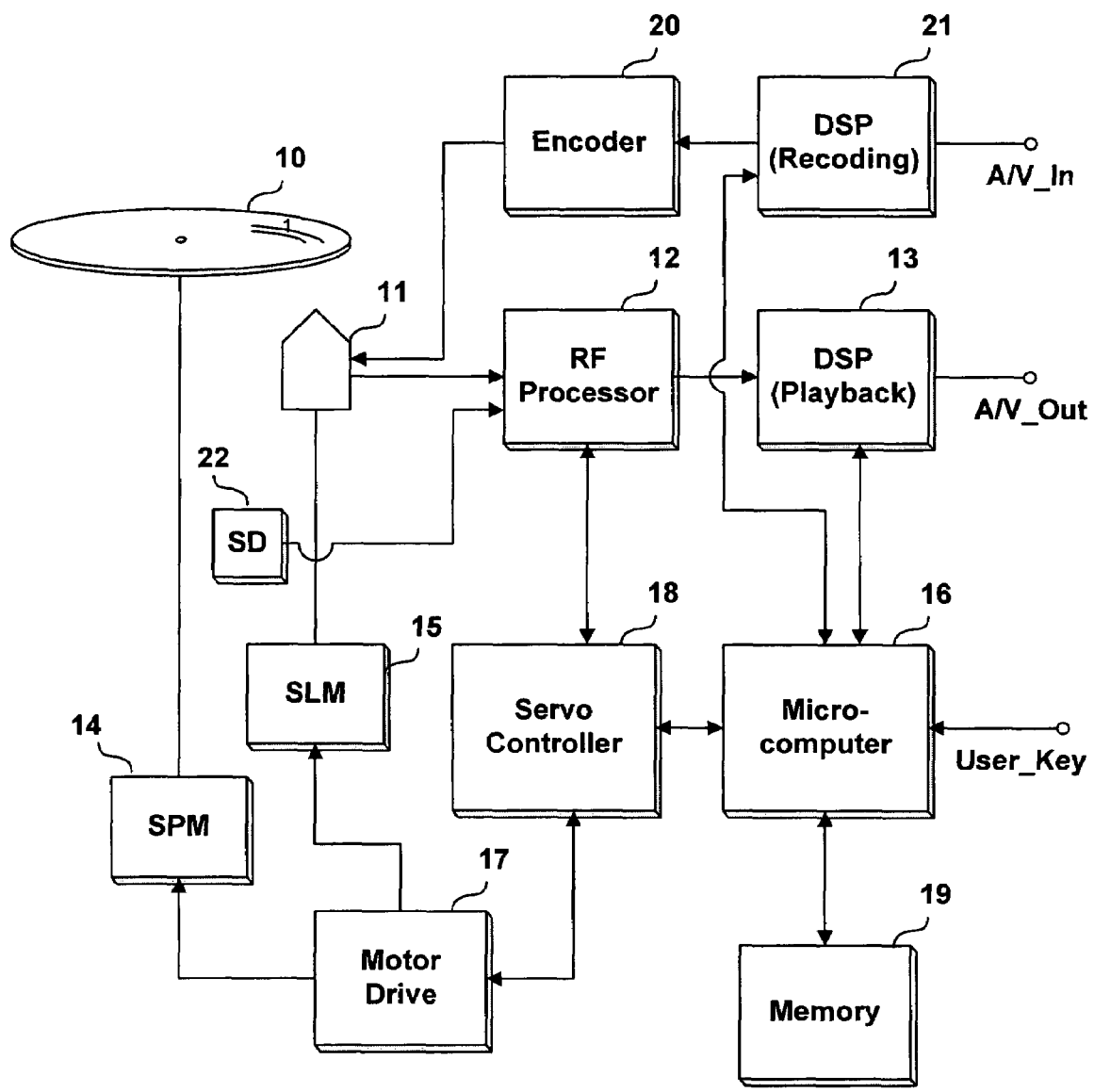
FIG. 1 is a schematic illustration of an exemplary optical disc device to which a focus servo control method in accordance with an embodiment of the invention may be applied.

The focus servo control method in accordance with embodiments invention may be applied to various types of optical disc devices including, but not limited to CD or DVD recorders configured as shown, for example, in FIG. 1. The focus servo control method in accordance with embodiments of the invention is particularly useful for an optical disc device that can print a label on a non-data surface, such as, for example, a label surface of an optical disc such as the LightScribe disc discussed above. A LightScribe disc has been referred to simply for ease of discussion. However, it can be appreciated that the invention may be applied to any such disc which includes a surface on which a label may be printed, and, more particularly, to any such disc which preferably includes a data surface and a non-data surface which has been specially prepared for laser printing or etching.

FIG. 1 is a block diagram of an exemplary optical disc device in which the focus servo control method in accordance with embodiments of the invention may be implemented. As shown in FIG. 1, the optical disc device may include an optical disc 10, an optical pickup 11, an RF processor 12, a playback digital signal processor 13, a spindle motor 14 which rotates the optical disc 10, a sled motor 15 which moves the optical pickup 11 in a radial direction of the disc 10, a microcomputer 16, a motor drive 17, a servo controller 18, a memory 19, an encoder 20, and a recording digital signal processor 21.

An optical disc device capable of printing labels on a label surface thereof further includes a spoke detector 22 which detects spokes in a speed control features area provided on the disc 10. Based on a signal output by the spoke detector 22, the optical disc device capable of printing labels determines whether or not a disc 10 which includes a label surface, such as, for example, a LightScribe disc, has been inserted into the optical disc device, and if so, controls the rotational speed of the disc.

Figure 2:
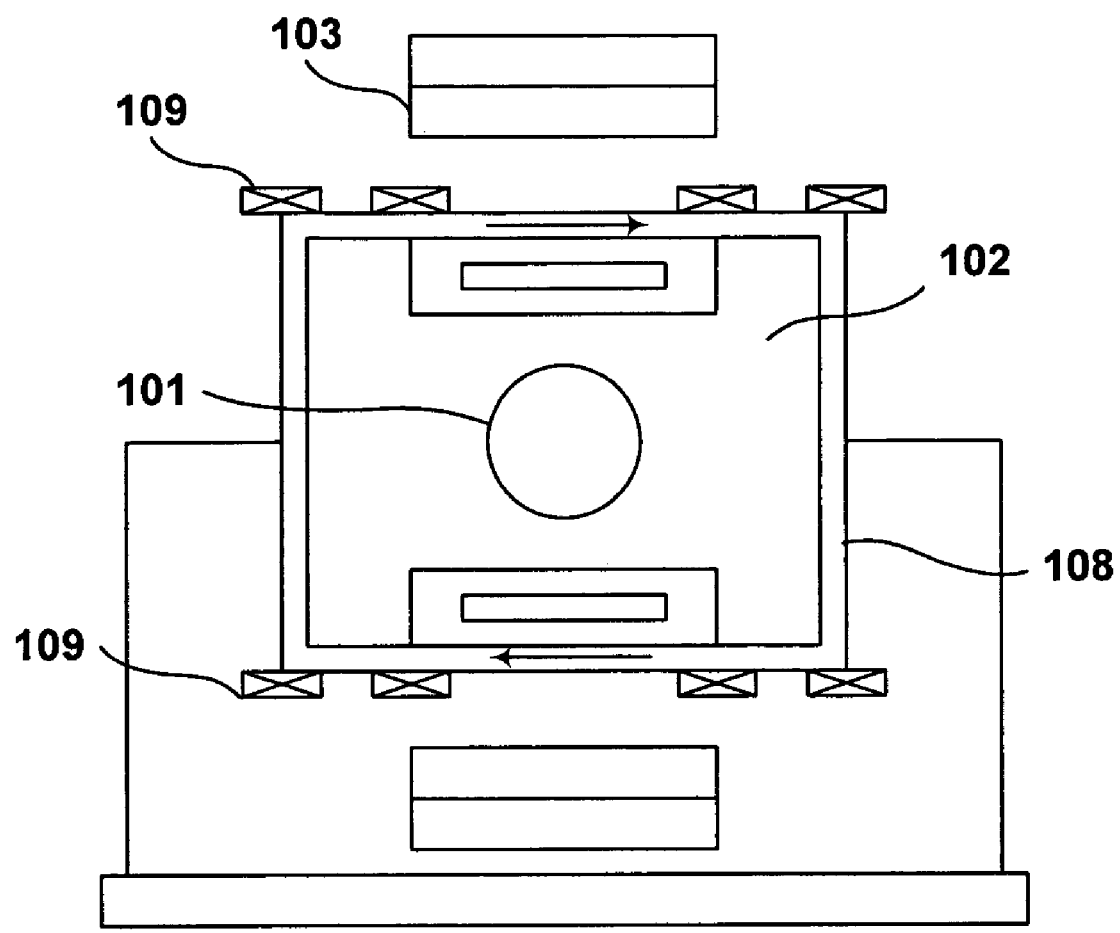
FIG. 2 is a schematic illustration of an exemplary actuator used with the optical pickup shown in FIG. 1.

FIG. 2 illustrates an actuator 100 for the optical pickup 111, in which an object lens 101 is centrally attached to a lens holder 102, a focusing coil 108 is wound around the lens holder 102, and a tracking coil 109 is attached to an upper surface of the focusing coil 108, with the focusing and tracking coils 108 and 109 facing a set of magnets 103. Electromagnetic forces generated by the magnets 103 in response to driving voltages cause the focusing coil 108 to provide for upward and downward, or vertical, movement of the object lens 101 within the lens holder 102, and cause the tracking coil 109 to provide for tracking, or horizontal, movement of the object lens 101 within the lens holder.

Figure 3:
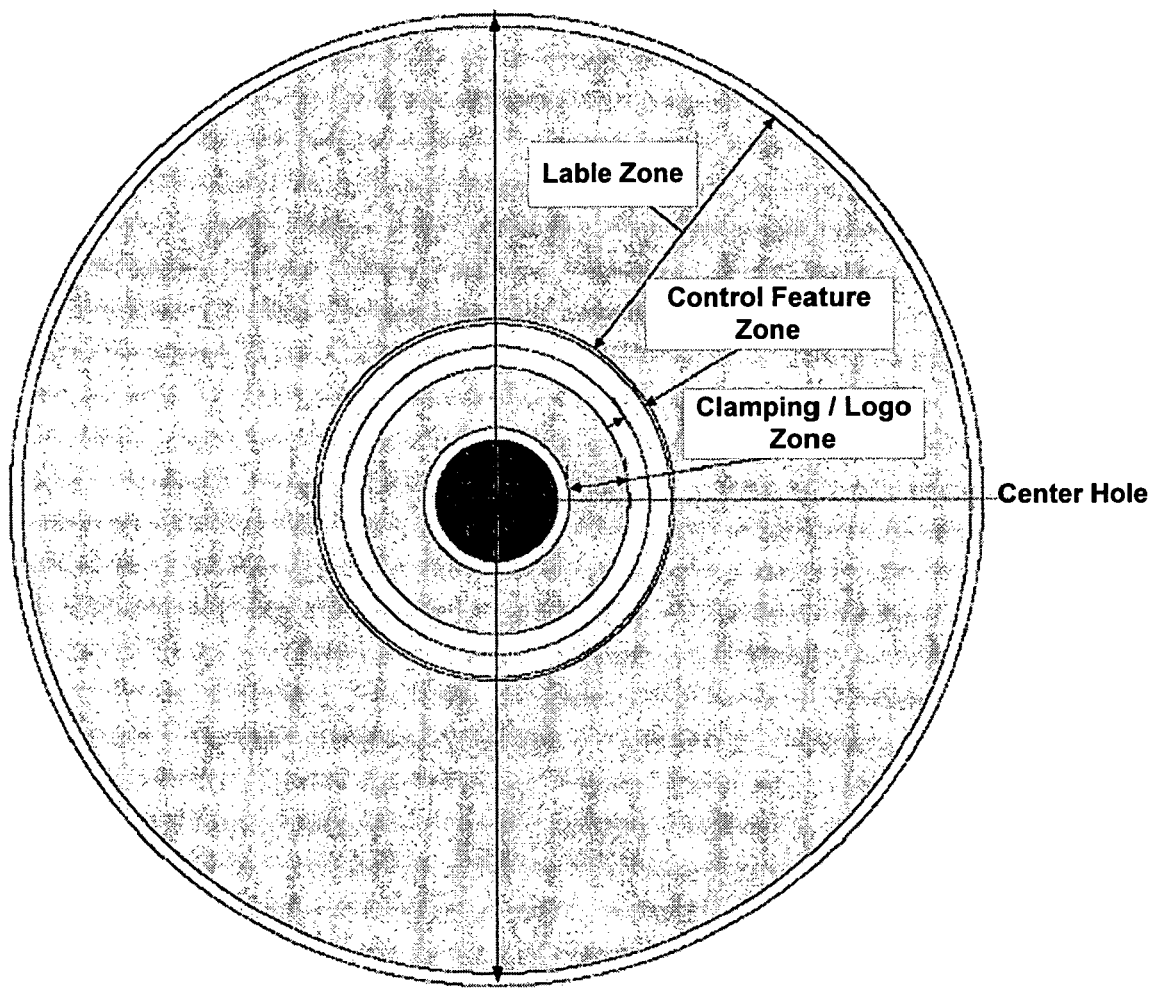
FIG. 3 is a top view of a label surface of an optical disc as shown in FIG. 1.
Figure 4:
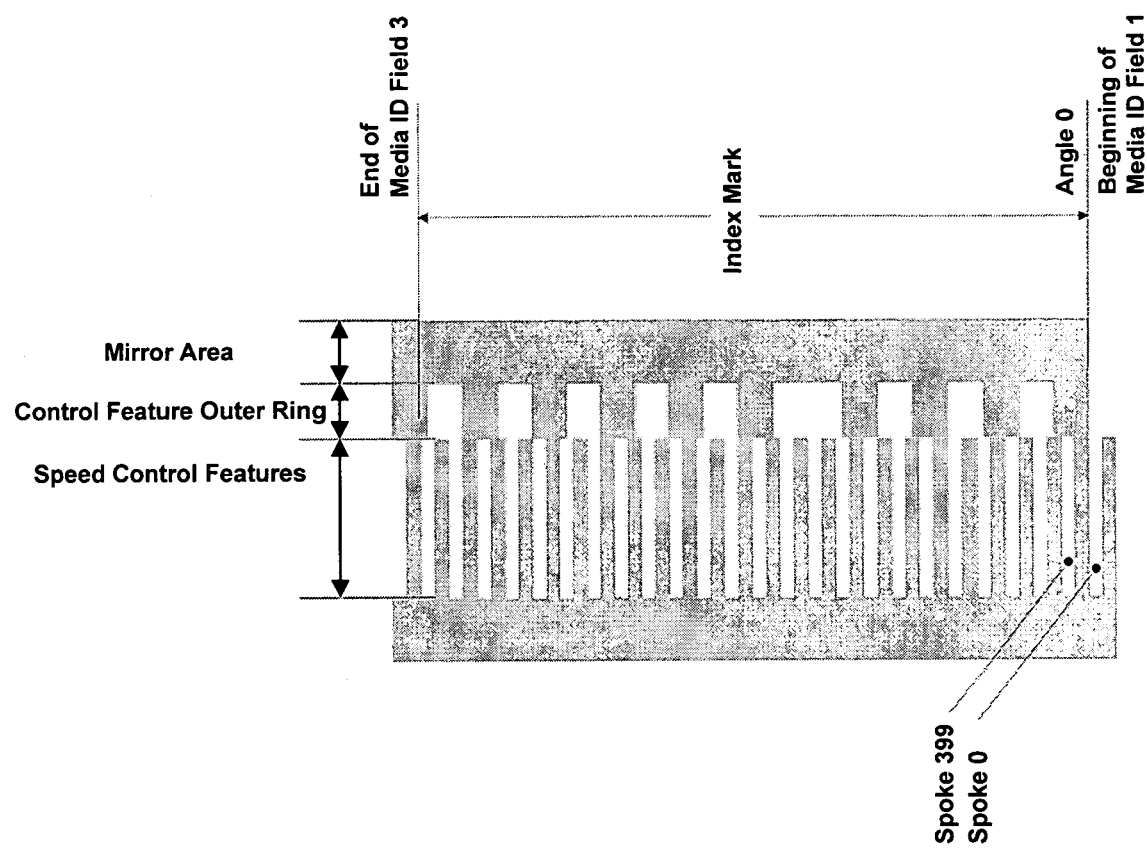
FIG. 4 illustrates a control feature zone and an index mark pattern of an optical disc as shown in FIG. 3.

An exemplary label surface of a disc is as shown in FIG. 3 and a layout of a control feature zone and an index mark pattern on the label surface of the disc are shown in FIG. 4.

The control feature zone includes a speed control features area, a Control Feature Outer Ring (CFOR) area, and a mirror area. The index mark recorded in the CFOR area is provided to make it easy to locate the CFOR area and to establish a first spoke (Spoke 0) which starts at the end of the index mark and provides a reference position in the circumferential direction of the disc.

Figure 5:
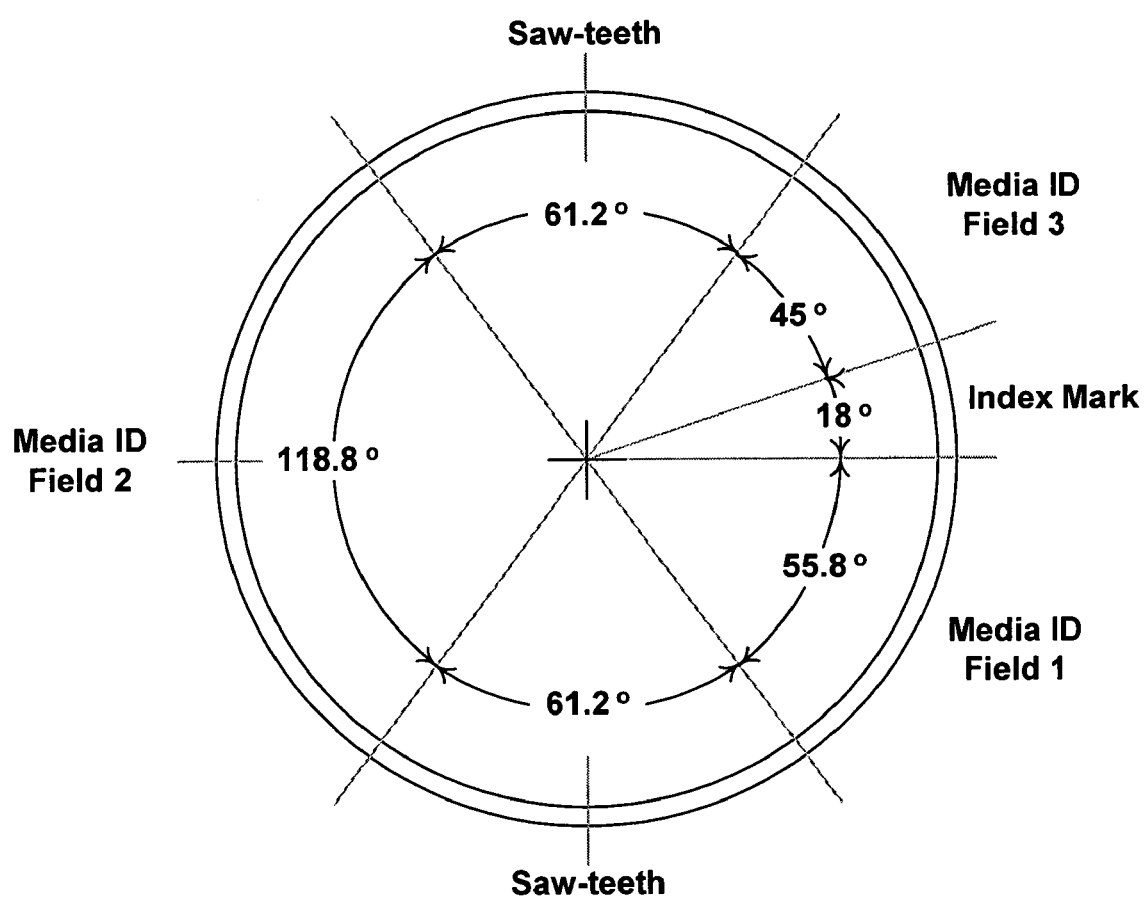
FIG. 5 illustrates a Control Feature Outer Ring (CFOR) area of the control feature zone of an optical disc as shown in FIG. 3.

FIG. 5 shows the Control Feature Outer Ring (CFOR) area in more detail. The CFOR area is divided into an index mark field, saw-teeth fields, and media ID fields (Media ID Field 1, 2, 3). It is noted that a wobble land/groove, in which Absolute Time In Pre-groove (ATIP) information indicating a current position is recorded, is not formed on the label surface of the disc. Thus, it is not possible to apply feedback tracking servo control based on error signals, nor to gain random access to a desired position on the label surface of the disc in the manner typically employed on the data surface of the disc.

Rather, it is possible to record a label on the label surface of the disc sequentially, from an inner to an outer circular section based on feed-forward tracking servo control. Since no focus error signal is generated y the label surface of the disc, there is no choice but to perform feed-forward focus servo control on the label surface, which cannot compensate for surface vibration components or unevenness present on the disc as described above.

In the focus servo control method in accordance with embodiments of the invention, the label surface of the optical disc is divided radially into a predetermined number of areas arranged in a circumferential direction about the center of the disc. For exemplary purposes, the disc shown in FIG. 7 has been divided into 20 radial areas. However, it can be appreciated that other numbers of radial areas may also be appropriate. Respective optimal focus points of the radially divided areas are detected and stored, and a feed-forward focus servo operation is performed based on the stored optimal focus points.

The label surface of the optical disc is also divided circumferentially into a predetermined number of areas arranged in the radial direction. For exemplary purposes, the disc has been divided into 32 circumferential areas (32 by 32 tracks). However, it can be appreciated that other numbers or circumferential areas may also be appropriate. For each of the circumferentially divided areas, the above procedure may be performed in which the label surface is divided radially into a predetermined number of areas, respective optimal focus points of the radially divided areas are detected, and the focus servo operation is performed using the detected optimal focus points. Similarly, when jumping from an inner position to an outer position, the above procedure can be performed from the outer position in the same manner.

Figure 6:
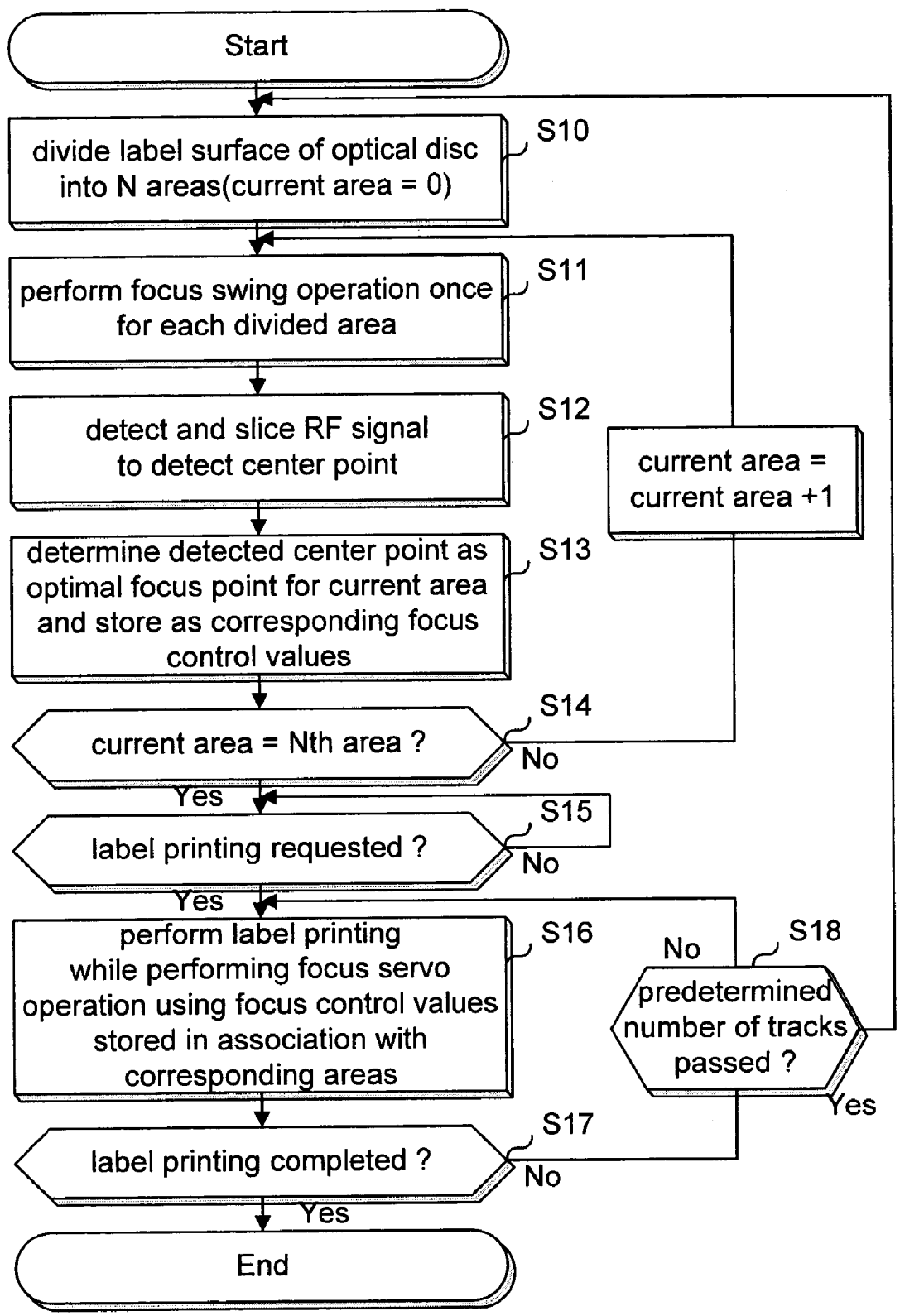
FIG. 6 is a flow chart of a focus servo control method for an optical disc device, in accordance with an embodiment of the invention.
Figure 7:
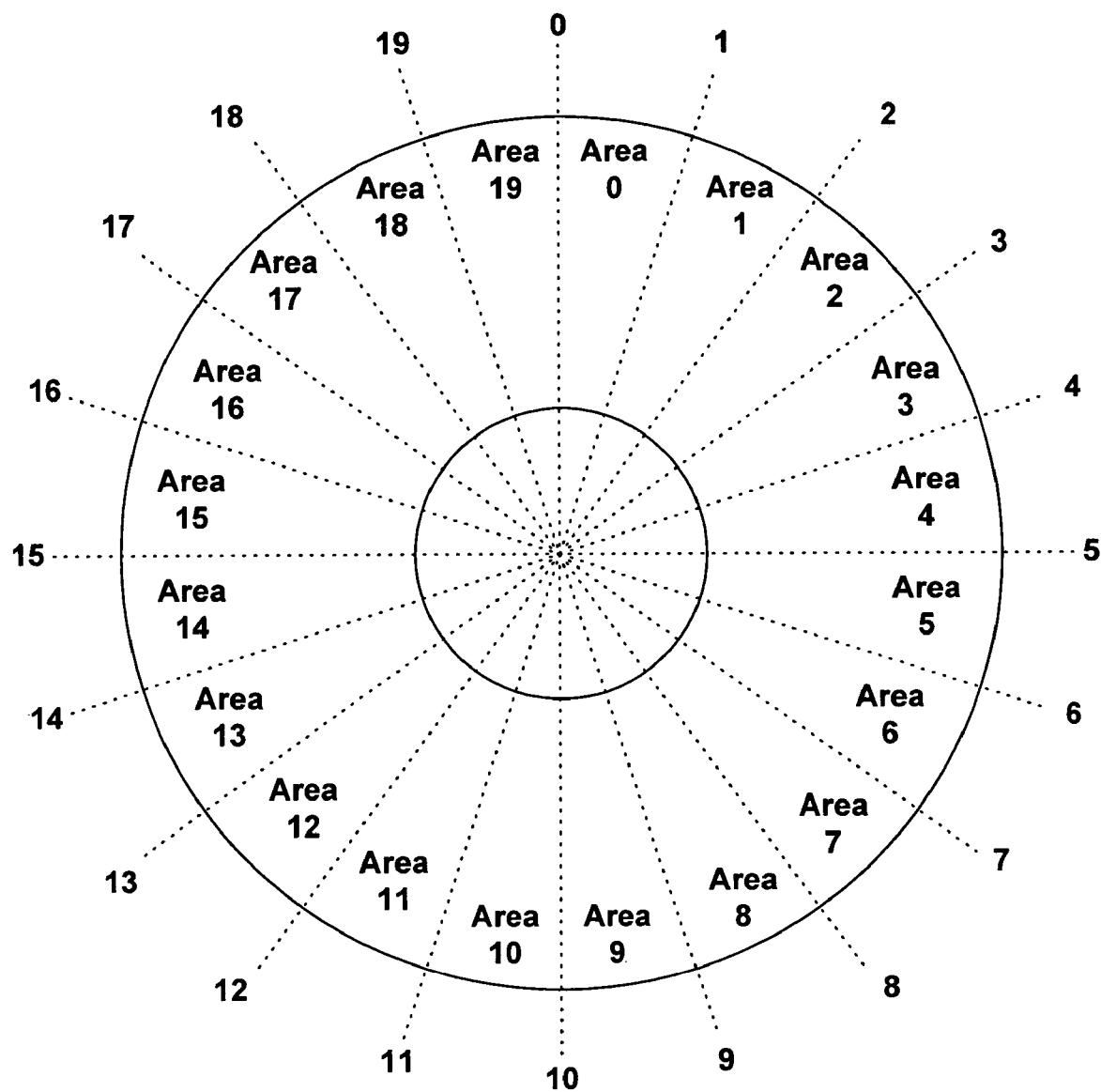
FIG. 7 is a top view of a label surface of an optical disc which is radially divided into a number of areas, in accordance with an embodiment of the invention.

FIG. 6 is a flow chart of a focus servo control method of an optical disc device in accordance with an embodiment of the invention. If a disc such as, for example, a LightScribe disc, is loaded in the device with the label surface facing down so that the label surface faces the optical pickup 11, the microcomputer 16 divides the surface radially into N areas (S10). For example, the label surface of the optical disc is divided radially into 20 areas (Area 0 to Area 19) arranged as shown in FIG. 7, and respective optimal focus points of the radially divided areas are detected, so that feed-forward focus servo control can compensate for surface vibration components present on the label surface based on the detected optimal focus points. If the label surface is divided radially into a plurality of areas, the first divided area starts at the first spoke (Spoke 0) positioned at the end of the index mark, the first spoke (Spoke 0) providing a circumferential reference point on the label surface of the disc.

The microcomputer 16 then controls operation of the servo controller 18, causing the spindle motor 14 to rotate the optical disc 10 and the sled motor 15 to position the optical pickup 11 at a predetermined position in an inner section of the label surface. A focus swing operation which moves the objective lens 102 of the optical pickup 11 up and down is performed by the actuator 100 for each of the 20 areas as shown in FIG. 8 (S11).

Figure 8:
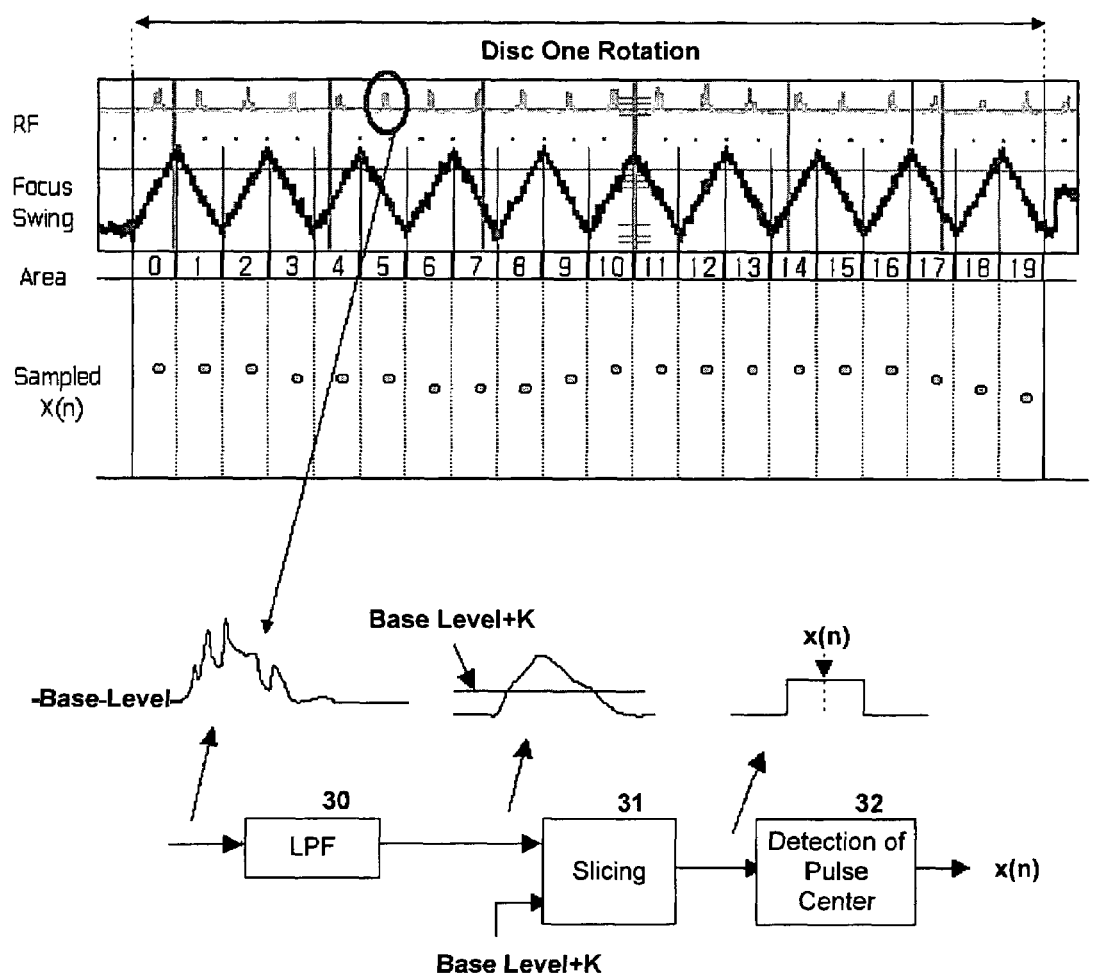
FIG. 8 illustrates a procedure for detecting center points of an RF signal, in accordance with an embodiment of the invention.

During the focus swing operation, the microcomputer 16 detects center points of a detected RF signal as shown in FIG. 8. The RF signal may include effects due to variations encountered on the disc, such as, for example, high frequency components due to, for example, dust and impurities on the label surface and unevenness of the label surface. These high frequency components of the detected RF signal may be removed using, for example, a low pass filter (LPF) 30, a slice 31, and a pulse center detector 32. The RF signal may then be sliced into specific reference-level signals and respective center points of the sliced signals may be detected (S12).

The detected center points are considered respective optimal focus points of the 20 areas, and corresponding focus control values determined when the respective optimal focus points are detected are stored in association with a corresponding area. For example, the memory 19 may receive respective optimal focus driving voltages associated with the 20 areas and store these voltages as the respective focus control values, or the memory 19 may receive respective focus offset voltages associated with the 20 areas and store these voltages as the respective focus control values (S13). A sample tabulation of areas and corresponding focus control values is shown in FIG. 9.

The microcomputer 16 performs this series of operations from the first to the last of the N radially divided areas (S14). In this example, these operations are performed on 20 radially divided areas. However, it would be well understood by those of ordinary skill in the art that other numbers of radially divided areas may also be appropriate. The microcomputer 16 may repeat the focus point detection operations for the N areas to detect more accurate focus points. The focus swing operation is completed when the respective optimal focus points of the N radially divided areas of the label surface have been detected and stored. The microcomputer 16 then confirms whether or not it has received a label print request (S15).

If label printing is requested (S15), the microcomputer 16 reads the focus control values stored in association with the corresponding areas, and confirms a current area on the label surface accessed by the optical pickup 11. The microcomputer 16 then drives the actuator 100 using a focus control value which corresponds to the confirmed current area to perform a label printing operation (S16). If the label printing operation is completed (S17), the microcomputer 16 may proceed to another operation.

If a predetermined outward radial distance is exceeded during the label printing operation, such as when, for example, a predetermined number of tracks have been passed (S18), the label printing operation is suspended and the above steps S10 to S14 are repeated to detect respective optimal focus points of a predetermined number of radially divided areas at the suspended position and store corresponding focus control values. The label printing operation is then carried out while performing feed-forward focus servo control using the stored focus control values. The above procedure is may be repeated periodically, such as, for example, every 32 tracks, to more accurately compensate for surface vibrations of the optical disc.

Similarly, if, after the label printing operation is completed, there is a need to resume the label printing operation in an area which is radially beyond the completed position, the optical pickup 11 may be moved and the above procedure may be repeated. More particularly, after moving to a position on the outer area, respective optimal focus points for a predetermined number of radially divided areas at the new position may be determined and then corresponding focus control values may be stored.

The invention may be applied not only to the label surface of an optical disc, but also to a data surface of an optical disc.

As is apparent from the above description, a focus servo control method in an optical disc device in accordance with embodiments of the invention performs focus servo control in a feed-forward fashion while also compensating for surface vibrations present on an optical disc, thereby making it possible to properly perform label printing regardless of any surface vibrations or unevenness on the optical disc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of printing on a LightScribe disc, comprising:
   determining whether a recordable medium is a LightScribe disc based on a first pattern corresponding to spokes provided near an inner circumference of the recordable medium using a spoke detector;
   determining whether a surface facing an optical pickup device corresponds to a data surface or a label surface based on whether reflection of optical light occurs on the surface or within the LightScribe disc;
   detecting a second pattern corresponding to an index mark;
   synchronizing with a spoke corresponding to position "0", the spokes providing location information of an index mark, a saw teeth area, a media ID area, and controlling a speed of rotation of the LightScribe disc;
   detecting media ID on the Lightscribe disc; and
   printing on the label surface of the LightScribe disc, wherein the label surface is divided radially into a plurality of areas, and a first focus point for the optical pickup device is determined for each of the plurality of areas, and the first focus point is used in its corresponding area of the label surface during printing.

2. The method of claim 1, further comprising, after traversing 32 tracks during revolution of the LightScribe disc, determining a second focus point for the optical pickup device for each of the plurality of areas, and using the second focus point for printing during the next 32 tracks during revolution of the LightScribe disc.

3. The method of claim 2, further comprising determining a new focus point for each of the plurality of areas for every 32 tracks traversed during revolution of the LightScribe disc during printing.

4. The method of claim 1, wherein when there is a jump from near an inner circumference toward an outer circumference of the disc, a new focus point is obtained for each of the plurality of areas for printing.

5. The method of claim 1, wherein the label surface is divided radially into 20 areas.

6. A method of printing a label on recordable medium including a data surface configured to receive and store data on a first side thereof, and a label surface configured to receive a label printed thereon on a second side opposite the first side, the method comprising:
   reading a first pattern from the recordable medium to determine if the recordable medium includes both a data surface on a first side thereof and a label surface on a second side opposite the first side thereof, wherein the first pattern is read by a spoke detector and comprises a plurality of spokes provided proximate an inner circumference of a recordable medium;
   determining if a surface of the recordable medium facing an optical pickup device corresponds to the data surface or the label surface of the recordable medium based on a reflection of optical light from the surface of the recordable medium facing the optical pickup;
   synchronizing operation of the optical pickup device with a reference position delineated by the first pattern if it is determined that the surface of the recordable medium facing the optical pickup device is the label surface;
   dividing the label surface into a plurality of radial areas;
   determining a plurality of first optimum focus points each corresponding to a respective area of the plurality of areas; and
   performing a label printing operation to print an image on the label surface of the recordable medium based on the plurality of first optimum focus points.

7. The method of claim 6, wherein determining if a surface of the recordable medium facing an optical pickup device corresponds to the data surface or the label surface comprises:
   determining that the surface facing the optical pickup is the data surface if optical light is reflected from the surface facing the optical pickup; and
   determining that the surface facing the optical pickup is a label surface if light is not reflected from the surface facing the optical pickup.

8. The method of claim 6, wherein synchronizing operation of the optical pickup device with a reference position delineated by the first pattern compromises synchronizing operation of the optical pickup device with a spoke of the plurality of spokes which corresponds to a zero position on the inner circumference of the recordable medium.

9. The method of claim 6, further comprising suspending the label printing operation if the optical pickup exceeds a first predetermined outward radial distance.

10. The method of claim 9, wherein the first predetermined outward radial distance is approximately 32 tracks.

11. The method of claim 9, further comprising determining a plurality of second optimum focus points each corresponding to a respective area of the plurality of areas, and resuming the printing operation on the label surface of the recordable medium based on the plurality of second optimum focus points.

12. The method of claim 11, wherein resuming the printing operation comprises resuming the printing operation beginning substantially at the first predetermined outward radial distance at which the printing operation was suspended, and sustaining the resumed printing operation for a second predetermined outward radial distance.

13. The method of claim 12, wherein the second predetermined outward radial distance is approximately 32 tracks.

14. The method of claim 6, wherein synchronizing operation of the optical pickup device with a reference position delineated by the first pattern comprises controlling a speed of rotation of the recordable medium.

15. The method of claim 6, wherein the reference position delineated by the first pattern also provides location information related to at least one of a plurality of index marks, a saw teeth area, and a media identification area.

16. The method of claim 6, wherein performing a label printing operation to print an image on the label surface of the recordable medium based on the plurality of first optimum focus points comprises performing focus servo control based on the plurality of first optimum focus points.

17. The method of claim 16, wherein the focus servo control is performed in a feed-forward manner.

18. The method of claim 6, wherein determining a plurality of first optimum focus points each corresponding to a respective area of the plurality of areas comprises:
   positioning a focus actuator in each of the plurality of areas to detect a respective RF signal in each of the plurality of areas; and
   determining a corresponding center point for each of the respective RF signals detected to determine corresponding focus control information used to perform the label printing operation.

19. The method of claim 18, wherein the corresponding focus control information comprises a driving voltage or an offset voltage.

20. The method of claim 18, wherein determining a corresponding center point for each of the respective RF signals to determine corresponding focus control information comprises:
   removing a high frequency component from each of the respective RF signals and slicing each of the respective RF signals into reference level pulses;
   determining a center point for each of the sliced RF signals; and
   determining voltages which correspond to the each of the center points of each of the sliced RF signals to drive the focus actuator.

* * * * *